United States Patent [19]
Kusters

[11] Patent Number: 6,003,771
[45] Date of Patent: Dec. 21, 1999

[54] SYSTEM AND METHOD FOR COLLECTING OR STORING OBJECTS IN A WAREHOUSE

[76] Inventor: Jan T Kusters, Gorterplaats 2, NL-6531 HZ Nijmegen, Netherlands, NL-6531

[21] Appl. No.: 08/817,226

[22] PCT Filed: Oct. 10, 1995

[86] PCT No.: PCT/NL95/00346

§ 371 Date: Jun. 2, 1997

§ 102(e) Date: Jun. 2, 1997

[87] PCT Pub. No.: WO96/11156

PCT Pub. Date: Apr. 18, 1996

[30] Foreign Application Priority Data

Oct. 10, 1994 [NL] Netherlands ............................ 9401661
Jan. 23, 1995 [NL] Netherlands ............................ 9500111

[51] Int. Cl.⁶ ............................... G06K 15/00; B65G 1/00
[52] U.S. Cl. ......................................... 235/383; 414/273
[58] Field of Search .................................. 235/383, 385, 235/375, 462.2, 462.01, 462.14; 414/273, 277, 662, 783

[56] References Cited

U.S. PATENT DOCUMENTS

| | | | |
|---|---|---|---|
| 5,025,140 | 6/1991 | Varley | 235/385 |
| 5,113,349 | 5/1992 | Nakamura et al. | 364/478 |
| 5,175,690 | 12/1992 | Berthier et al. | 364/478 |
| 5,216,618 | 6/1993 | Arita et al. | 364/478 |
| 5,444,226 | 8/1995 | Collins, Jr. | 235/462 |
| 5,595,263 | 1/1997 | Pignataro | 186/53 |
| 5,691,684 | 11/1997 | Murrah | 235/385 |

*Primary Examiner*—Donald Hajec
*Assistant Examiner*—Daniel Sherr
*Attorney, Agent, or Firm*—Jones, Day, Reavis & Pogue

[57] ABSTRACT

A method and device for collecting objects in a warehouse includes a movable apparatus that is automatically moved to a location where objects are to be taken from a shelf of a warehouse rack. The apparatus subsequently indicates how many objects are to be collected and/or provides other information. The apparatus is also capable of moving itself along a rail which extends along the warehouse rack.

20 Claims, 2 Drawing Sheets

SYSTEM AND METHOD FOR COLLECTING OR STORING OBJECTS IN A WAREHOUSE

BACKGROUND OF THE INVENTION

1. Field of the Invention

The invention relates to a device and a method for collecting or storing objects in a warehouse, whereby objects are collected or stored at a particular location by a warehouse assistant. The warehouse assistant thereby needs to be provided with information with regard to the location from which objects are to be collected or stored and with regard to the number of objects to be taken from a particular location or to be stored at that location. When collecting objects a label must in some cases be directly affixed to said objects or groups of objects must otherwise be provided with certain information. Although the invention may be used both for collecting and for storing objects, particularly the collecting of objects will be discussed herein.

2. Summary of the Invention

The collecting of objects from a warehouse may take place entirely automatically, for example by means of robots, but it may also be done by warehouse assistants, whereby the warehouse assistant utilizes auxiliary means in order to be able to do his work efficiently. It is important thereby that the assistant is provided with clear information in an efficient manner, that he can easily find the respective shelf of the warehouse rack, that he has his hands free as much as possible to pick up the objects in question, whilst it is furthermore important that the number of manipulations to be performed by the assistant is reduced.

The object of the invention is to provide a method and a device whereby the risk of counting errors and/or location errors is reduced, whilst furthermore the speed at which operations are carried out can be increased, so that it becomes possible for a warehouse assistant to collect objects in a warehouse in an efficient manner.

In order to accomplish that objective use is according to the invention made of an apparatus which can move automatically to a location where objects are to be taken from a shelf of a warehouse rack, which apparatus subsequently indicates how many objects are to be collected and/or provides other information. The apparatus can move along a rail thereby, which rail may extend in substantially horizontal direction along a warehouse rack, at some distance from the ground.

The term "shelf" used in the present disclosure refers to a part of a warehouse rack where objects, usually of the same type, are present. The term "location" refers to a place where the apparatus may be located and where several shelves may be present, one being positioned above the other, for example. The term "warehouse rack" is to be given a broad interpretation. It may inter alia refer to a number of pallets arranged in side-by-side relationship, with objects present thereon. In that case the rail may be provided along the places where the pallets, which form the shelves in that case, may be located.

This enables a warehouse assistant to have his hands completely free for collecting and/or otherwise treating objects, whilst the shelf from which objects are to be collected is faultlessly indicated as a result of the apparatus being present in situ, whilst the apparatus furthermore provides, likewise in situ, that information which the warehouse assistant requires in collecting the respective objects.

According to one aspect of the invention the apparatus may be designed such that it can be manually coupled to a rail extending along the warehouse racks in question, so that one apparatus may be used on different rails, whereby each rail extends along a different warehouse rack, for example.

Furthermore each rail may be provided with an apparatus, or more than one apparatus may travel on the same rail, whereby the apparatuses are unable to pass each other, of course. What is possible, however, is that two apparatuses can pass each other "electronically", in that they exchange information and stored data with each other. Furthermore the rail may according to the invention be provided with bar codes, which indicate the location and/or the shelves at which the apparatus is present. Furthermore the apparatus may (also) be provided with a stepping motor, which is capable of moving the apparatus along a certain distance, if desired.

According to one aspect of the invention the apparatus may be provided with one or more units, such as a keyboard for giving instructions to the apparatus, a display on which visual information may be provided, a printer which can provide written information, which may be added to the objects, or which can deliver printed labels which may be affixed to the objects, a receiver/transmitter, which can keep in touch with a central computer which provides the apparatus with the necessary information, a loudspeaker, which may give acoustic information or signals, a warning light, which may provide visual information or signals, an indicator, which may refer to a particular shelf of the warehouse rack, a rechargeable and possibly exchangeable battery, which may be charged when the apparatus is in a rest position or is present on a base station, a carrying handle, with which the apparatus can be readily picked up from the rail, a scanner, which can read a bar code provided on the rail, and a bar code scanner, which may or may not be manually controlled, for identifying the objects. The above units will be discussed in more detail hereafter with reference to an embodiment of the invention.

The term scanner used in the present disclosure refers to a device for reading a bar code or another code, it also comprises a so-called reader which can be moved along a bar code.

According to the invention a conveyor may furthermore be provided, on which objects may be transported and which may be moved by operating staff (a warehouse assistant) to the place where the apparatus is located. The conveyor may thereby be provided with means for wireless communication with the apparatus. The keyboard and/or the display and/or other units connected to the apparatus may thereby be mounted on the conveyor, which may facilitate communication between the apparatus and the operating staff.

Furthermore indicators, for example in the form of lights, may be present on the conveyor, which indicators are controlled by the apparatus and which are capable of indicating at what location or in what compartment of the conveyor one or more objects are to be placed. Furthermore the conveyor may comprise movable compartments, which are moved in such a manner that a particular compartment becomes accessible, so that the objects can only be placed in that particular compartment. Said moving or making the compartments otherwise accessible may thereby be controlled by the apparatus.

According to one aspect of the invention the apparatus may transmit information to a location where the objects undergo further treatment, which treatment may take place on the basis of that information. This information may include the origin and/or the destination of the objects in question. On the basis of this information a roller conveyor may for example be controlled, on which the objects are conveyed to their correct destination. Furthermore this information may be received by a receiver present on a trolley or on a row of hitched-together trolleys, which receiver will for example turn on lights at locations where the goods in question are to be deposited.

The invention may be used both for collecting objects in a warehouse and for placing or storing objects in a warehouse.

Further aspects of the invention will be described with reference to an embodiment and are defined in the claims.

BRIEF DESCRIPTION OF THE DRAWINGS

Hereafter an embodiment of a device according to the invention will be described in more detail by way of illustration with reference to the drawing, wherein.

The Figures are merely diagrammatic illustrations of an embodiment of the invention.

DETAILED DESCRIPTION OF THE PREFERRED EMBODIMENT

Figure 1:
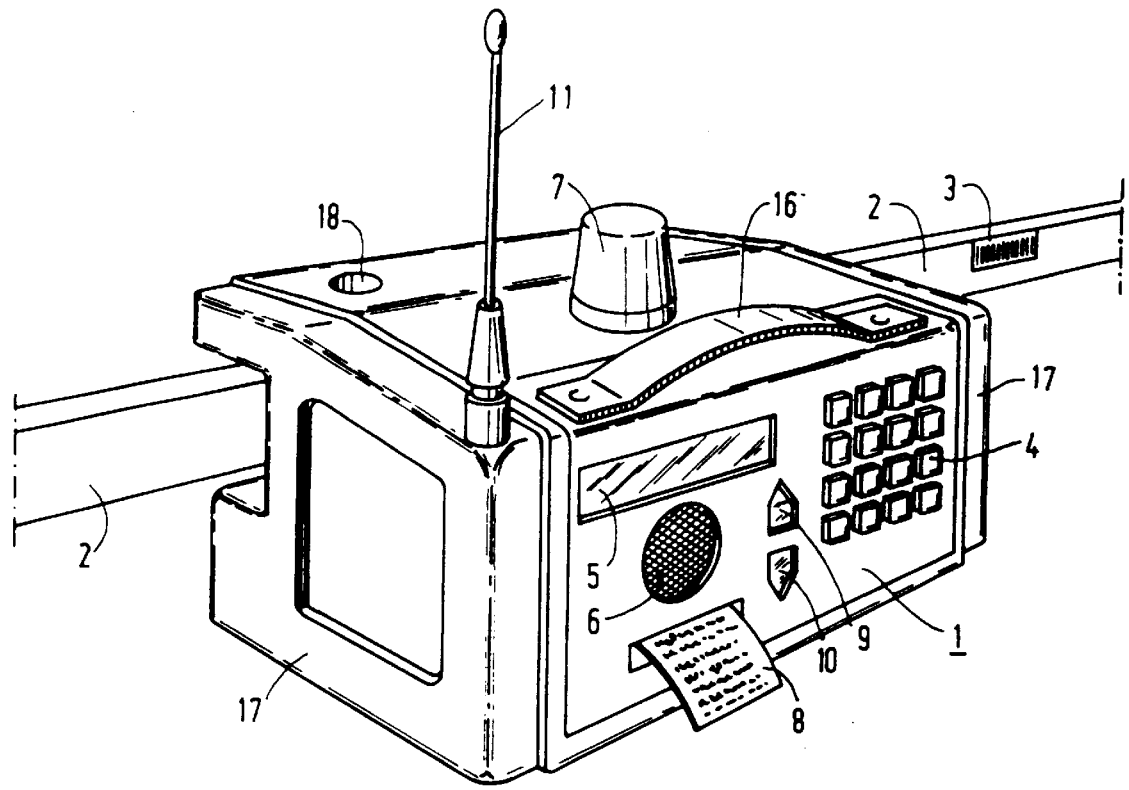
FIG. 1 is a perspective view of the device.

FIG. 1 shows an apparatus 1 which can be moved along a rail 2. During the movement of the apparatus 1 a scanner (not shown) will detect the bar code 3, which enables the apparatus 1 to determine where exactly it is located. The manner in which the apparatus 1 is mounted on the rail 2 will be explained in more detail with reference to FIG. 2.

The apparatus 1 may be provided with a great many units, a number of which are indicated in FIG. 1. Thus the apparatus 1 may be provided with a keyboard 4, by means of which information can be supplied to the apparatus 1 by hand. Sixteen keys are shown in the Figure, for example for the digits 0–9 and for a number of other commands.

According to FIG. 1 the apparatus 1 includes a display 5, for example an LCD display, on which information can be displayed. Furthermore a loudspeaker 6 is provided, which is capable of delivering acoustic signals, as well as a lamp 7, which is capable of delivering light signals.

In the present embodiment the apparatus 1 is furthermore provided with a printer, which is capable of delivering written information, for example in the form of a printed, self-adhesive label 8 or other printed information.

The rail 2 is mounted, for example at a height of 0.5–2 m above the ground, along a warehouse rack comprising shelves from which objects are to be collected. A shelf may be present both above and below the apparatus 1, with indication lights 9 and 10 being provided to indicate from which shelf objects are to be collected. When the light 9 goes on, this indicates that objects are to be collected from the shelf above the apparatus 1, whilst the light 10 indicates that objects are to be collected from the shelf below the apparatus 1.

The apparatus is furthermore provided with a receiver/transmitter, in order to be able to communicate with a basic unit, which is preferably provided with a computer. The apparatus 1 is provided with an antenna 11 for that purpose.

Figure 2:
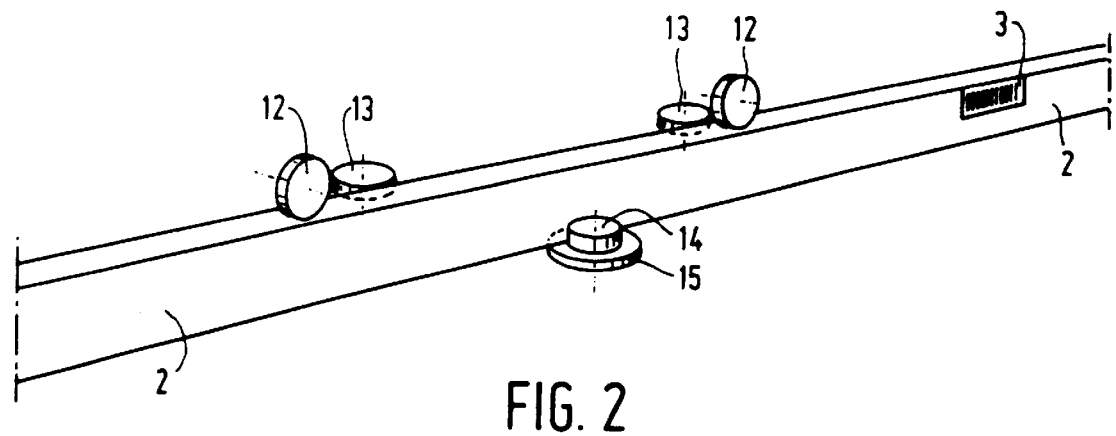
FIG. 2 diagrammatically shows the way in which the apparatus in mounted on the rail.

FIG. 2 shows the rail 2 and a number of wheels, which are rotatably mounted in the apparatus. The wheels are only diagrammatically illustrated, and the apparatus in which the wheels are rotatably mounted is not shown. In the illustrated position the wheels shown in FIG. 2 are located within the apparatus illustrated in FIG. 1.

According to FIG. 2 the apparatus is provided with two wheels 12, which can rotate in a horizontal plane on the upper side of the rail 2. Near each wheel 12 a wheel 13 is provided, which can rotate in a horizontal plane and which rests against the upper part of the rear side of the rail. A fifth wheel 14 rests against the lower part of the front side of the rail 2, whilst a flange 15 is provided under said wheel 14, which flange extends under the rail 2. The flange 15 is preferably stationary. One or more of said wheels 12, 13, 14 can be driven in order to move the apparatus along the rail. It will be apparent that the apparatus can be removed from the rail by tilting it slightly backwards, after which it can be lifted in upward direction. A handle 16 is provided on the upper side for that purpose, which makes it possible to carry the apparatus with one hand.

The position of the wheels shown in FIG. 2 enables the rail to describe a curve in a horizontal plane, for example a curve having a radius of 50 cm.

The sides 17 of the apparatus may be made of an elastic material, so that the shock in case of a collision can at least partially be absorbed.

The method according to the invention may be carried out as follows. In the rest position the apparatus 1 is present on a base station, where it may be provided with information, if necessary, and where the rechargeable batteries which may be present in the apparatus 1 can be recharged. In another preferred embodiment the apparatus is provided with an exchangeable battery, so that it can be used for a longer consecutive period.

Rails are provided along the warehouse racks from which objects are to be collected. This may be one continuous rail, possibly with curves, but it may also be a number or rails, which are mounted on several warehouse racks. Although the method may be carried out with one apparatus 1, it is also possible, if several rails are used, to provide each rail with an apparatus 1, whereby the apparatus does not have to be moved from one rail to another. The base station on which the apparatus 1 is present in the rest position may for example be provided at the end of a rail.

It is also possible to have more than on apparatus travel on one rail. The apparatuses may pass each other "electronically" thereby, in that they exchange information and stored data with each other.

Instead of equipping the apparatus with rechargeable batteries it is also possible to provide the rail and the apparatus with means, for example sliding contacts, for supplying electric current via the rail.

When objects are to be collected from warehouse racks, the apparatus 1 is activated and placed on the respective rail 2, if necessary. Then the apparatus is instructed to move to a shelf of the warehouse rack where objects are to be collected. The instruction may be given by means of the keyboard or via the basic station, with which the apparatus communicates. While the apparatus is moving along the rail a scanner provided in the apparatus 1 reads the bar codes provided on the rail. In this manner the apparatus will identify the location near the respective shelf of the warehouse rack, whereupon the apparatus will come to a standstill.

In order to indicate that the location in question has been reached the apparatus may deliver an acoustic signal, by means of a loudspeaker 6, and/or a light signal, by means of the lamp 7. Furthermore one of the indication lights 9, 10 may indicate whether a shelf above the apparatus or a shelf below the apparatus is meant. If the shelves are so small that more than two shelves are provided one above the other in the warehouse rack, it is also possible to indicate which of the shelves located above or below the apparatus is meant. This may for example be carried out by means of a vertically directed laser beam from aperture 18. This laser beam may hit an indicator, which will subsequently light up. By providing the shelves being positioned one above the other with indicators which are staggered relative to each other, it is possible to make the respective indicator light up by means of the vertically directed laser beam, dependent on the exact position of the apparatus 1 relative to the rail. To this end the apparatus may first determine its exact location relative to the place where the bar code 3 is affixed, after which the apparatus will move some distance along the rail, in dependence on the location of the indicator of the shelf in question, so that the indicator of that particular shelf is hit by the beam. In this manner it will be possible to reduce the number of errors made in collecting objects, because in this manner the shelf in question is indicated more clearly than when for example several indication lights 9, 10 are provided on the apparatus.

When the apparatus 1 has reached the correct location and indicates from which shelf objects are to be collected, the warehouse assistant may take as many objects from said shelf as are indicated on the display 5. Labels 8 may thereby be delivered by a printer provided in the apparatus, which labels are affixed to the objects when said objects are being collected. Furthermore other information may be provided, which may be added to the objects in question. After the necessary objects have been collected at the location in question, the warehouse employee may instruct the apparatus by means of the keyboard to move to the next location where objects are to be collected. The apparatus will then continue its movement along the rail until a bar code 3 indicating the location in question is identified, after which the apparatus may deliver a light signal and/or an acoustic signal again. If the next location is on another rail, this may also be indicated by the apparatus, for example by means of a respective text on the display and/or by means of a light signal or an acoustic signal, after which the warehouse assistant may take the apparatus from the rail 2 and couple it to the rail along which the apparatus is to trace the next location. This rail may be indicated on the display 5. When the location in question is reached, the apparatus may notify the warehouse assistant again by means of a light signal and/or an acoustic signal.

Furthermore a light signal and/or an acoustic signal may be delivered when the apparatus is unable to find the location in question or when an error occurs, as a result of which the apparatus cannot function correctly.

In the embodiment shown in FIG. 1 the display 5 and the keyboard 4 are positioned on the front side of the apparatus, but if the apparatus is positioned at a lower height, for example 1 meter above the ground, the display 5 and the keyboard 4 may also be provided on the upper side of the apparatus, of course.

Figure 3:
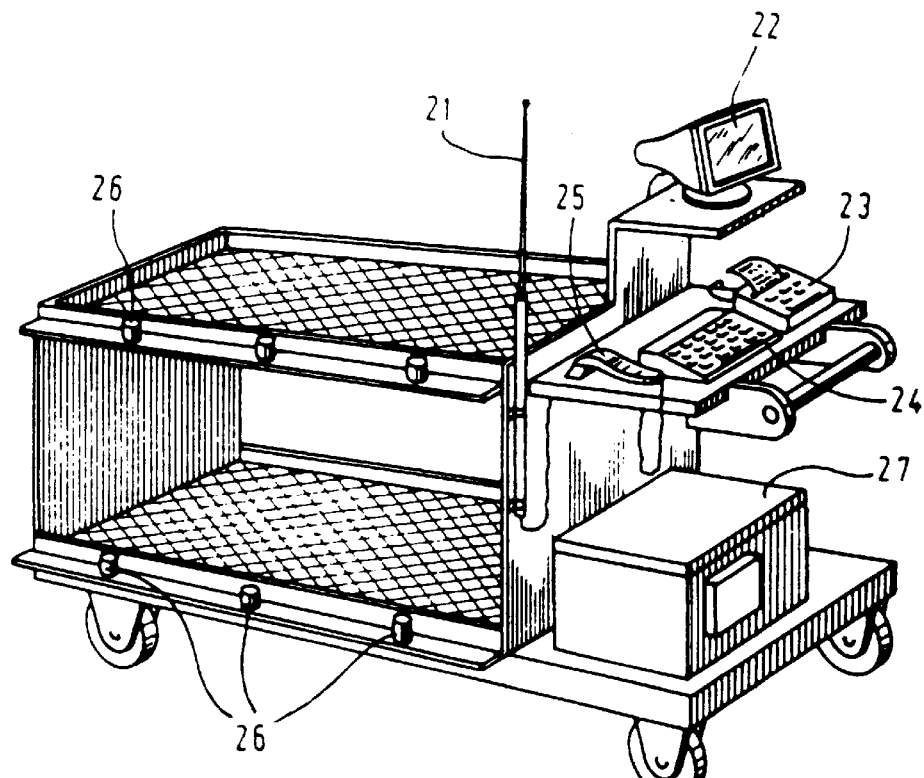
FIG. 3 shows a conveyor.

FIG. 3 shows a conveyor, which can be moved by operating staff of a warehouse to a location where the above-described apparatus is located and where objects are to be collected from a warehouse. The conveyor is provided with an antenna 21 for communicating with the above-described apparatus 1. In this embodiment a display 22, a printer 23, a keyboard 24 and a scanner 25 are placed on the conveyor. All this equipment is controlled via the apparatus 1, which is in wireless communication with the conveyor. It is not necessary that all this equipment is present on the conveyor, the equipment provided may also be confined to the keyboard 24, by means of which the warehouse assistant can control the apparatus 1.

Furthermore six lights 26 are provided on the conveyor, which may burn independently of the signals which are received from the apparatus 1. A burning light 26 thereby indicates that objects being collected in the warehouse are to be deposited at that location. When for example objects are to be collected for six different customers, each of said customers may be allocated a place on the conveyor, which place is provided with a light 26. In this manner it is practically excluded that an object collected in the warehouse is deposited at an incorrect location on the conveyor.

According to the invention the apparatus 1 may comprise a data processing unit, which may or may not operate independently, which controls the equipment on the conveyor. Moreover it is possible that the conveyor itself comprises a data processing unit, which may for example be housed in the holder 27.

Figure 4:
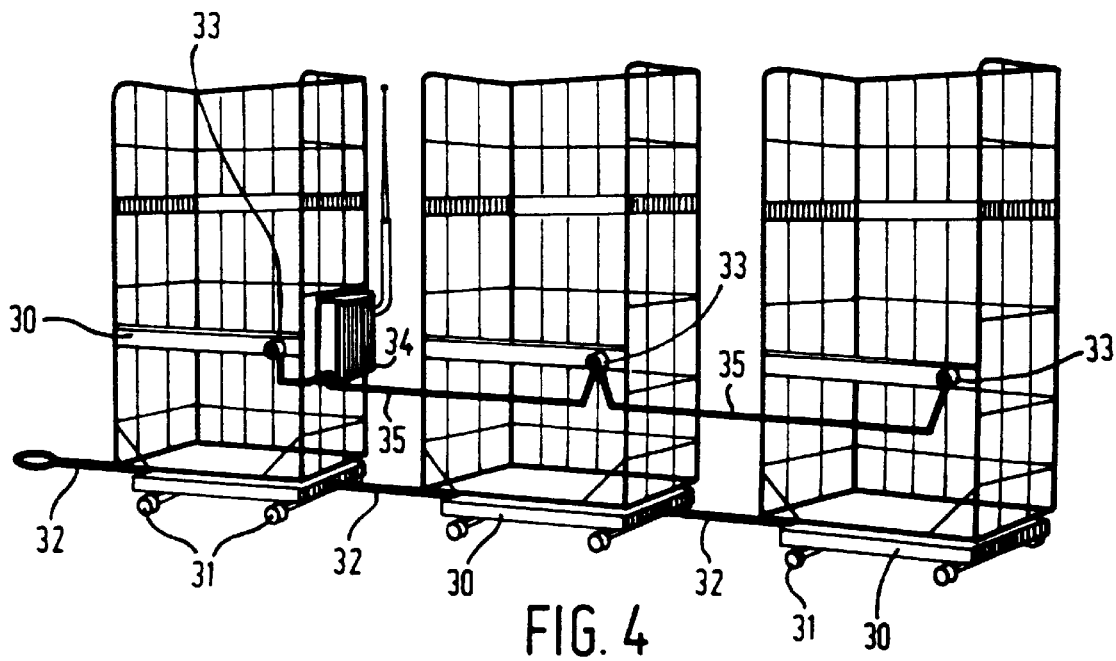
FIG. 4 shows another embodiment of a conveyor.

FIG. 4 shows a row of coupled-together trolleys, which may travel through the warehouse in order to collect objects (or to distribute objects). This embodiment three trolleys 30 are provided, which trolleys are provided with wheels 31 and which are each provided with a drawbar 32, by which the trolley 30 can be pulled. In each trolley 30 objects having a common destination are to be collected. A light 33 is provided on each of said trolleys 30, which lights may burn on the basis of signals received from receiver 34 via conducting wires 35. The receiver 34 may be provided with information via the apparatus or from a central basic station, which is in contact with the apparatus.

As it is known at all times in the system according to this embodiment from what location certain objects originate and/or for what location they are destined, also other installations for treating the objects may be controlled via the apparatus and/or the basic station. For example, a roller conveyor or another automatic conveyor may be controlled thereby.

Although the above embodiment has only been described with reference to the collecting of objects in a warehouse, it is also possible to distribute objects in a warehouse in a corresponding manner in order to store said objects there.

The explained embodiment of the invention is only to be considered as an example, to which a great many variations are possible.

I claim:

1. A method for collecting or storing objects in a warehouse comprising the steps of:

providing a programmable apparatus which is movable along a rail disposed adjacent to locations where objects are to be collected or stored, said apparatus having means for reading indicia indicative of specific locations disposed along said rail and having means for audibly or visibly instructing a warehouse person with respect to the objects to be collected or stored;

moving said apparatus along said rail while said apparatus reads indicia;

stopping said apparatus along said rail when said apparatus locates and reads a preprogrammed indicia means indicative of a predetermined location along said rail;

providing audible or visual information about an object with said instructing means after said apparatus is stopped at said predetermined location; and collecting or storing an object at said predetermined location where said apparatus has stopped moving along said rail.

2. The method of claim 1 including providing an independent combined transmitter and receiver and transmitting wireless communications to said apparatus from said transmitter and receiver to thereby program said apparatus.

3. The method of claim 1 wherein said indicia are in bar code form and said apparatus includes a bar code scanner.

4. The method of claim 1 including providing said apparatus with means for emitting an audible or visual signal when a preprogrammed location cannot be identified by said apparatus.

5. The method of claim 1 including providing said apparatus with means for emitting a light beam and aiming said light beam at said predetermined location once said apparatus has identified and stopped at said location.

6. The method of claim 1 including providing a conveyor with an independent wireless transmitter and receiver, and exchanging information between said apparatus and said transmitter and receiver relating to characteristics of an object identified by said apparatus.

7. A device usable in collecting or storing objects in a warehouse comprising:

a combined wireless transmitter and receiver for receiving data from and transmitting data to a remote controller;

indicia reading means for reading indicia indicative of a predetermined location at which a specific object is to be collected or stored;

drive means for moving said device along an associated rail to position said device at said predetermined location; and instruction issuing means for audibly or visibly providing information about said specific object once said device has reached said predetermined location.

8. The device of claim 7 including rotatable wheels for conveying said device along said associated rail.

9. The device of claim 7 including a display for displaying information relating to said specific object.

10. The device of claim 7 including means for issuing an audible or visual signal when said device has identified said predetermined location.

11. The device of claim 7 including a rechargeable battery for operating said drive means and said transmitter and receiver.

12. The device of claim 7 wherein indicia reading means is a bar code scanner.

13. The device of claim 7 including means for emitting a light beam and focusing said beam on an indicator provided on a warehouse rack.

14. The device of claim 7 including shock absorbing means for absorbing shock associated with the collision of the device with other objects in its path of movement.

15. The device of claim 7 including means for transmitting and receiving data signals to an associated remote conveyor useable to collect or store objects.

16. Apparatus useable in collecting or storing objects in a warehouse comprising:

a remote controller;

a device including a combined receiver and transmitter for receiving data signals from and transmitting data signals to said remote controller;

indicia reading means for reading indicia indicative of a predetermined location at which a specific object is to be collected or stored;

guide means for guiding said device adjacent to locations at which objects are to be collected or stored;

drive means for moving said device along said guide means;

a conveyor for moving objects to or away from said predetermined location at which said objects are to be stored or collected respectively;

and instruction issuing means for audibly or visibly providing information about said specific object once said device has reached said predetermined location.

17. The apparatus of claim 16 wherein said conveyor is provided with means for data communication with said device.

18. The apparatus of claim 17 wherein said data communication means includes a keyboard and a display.

19. The apparatus of claim 16 wherein said conveyor is provided with discrete compartments.

20. The apparatus of claim 19 wherein access to said compartments is controlled by said device.

* * * * *